US 6,262,901 B1

(12) United States Patent
Simopoulos

(10) Patent No.: US 6,262,901 B1
(45) Date of Patent: Jul. 17, 2001

(54) ADJUSTABLE DC-TO-DC CONVERTER WITH SYNCHRONOUS RECTIFICATION AND DIGITAL CURRENT SHARING

(76) Inventor: Anastastios V. Simopoulos, 2 Otis Pratt La., Middleboro, MA (US) 02346

( * ) Notice: Subject to any disclaimer, the term of this patent is extended or adjusted under 35 U.S.C. 154(b) by 0 days.

(21) Appl. No.: 09/677,033

(22) Filed: Sep. 29, 2000

(51) Int. Cl.[7] .................................................. H02M 3/335
(52) U.S. Cl. ................................................ 363/72; 363/26
(58) Field of Search .................................. 363/24, 25, 26, 363/56.06, 56.08, 65, 71, 72, 133, 134

(56) References Cited

U.S. PATENT DOCUMENTS

| | | | |
|---|---|---|---|
| 4,533,987 | * 8/1985 | Tomofuji et al. | 363/36 |
| 4,717,833 | 1/1988 | Small | 307/44 |
| 5,130,561 | * 7/1992 | Elliott et al. | 307/31 |
| 5,428,524 | 6/1995 | Massie | 363/79 |
| 5,905,369 | * 5/1999 | Ishii et al. | 323/272 |
| 5,956,245 | 9/1999 | Rozman | 363/89 |

* cited by examiner

Primary Examiner—Matthew Nguyen
(74) Attorney, Agent, or Firm—Cesari and McKenna

(57) ABSTRACT

A power conversion system configured for converting electrical power at an input voltage to an output voltage by means of synchronous rectification includes a first pulse width modulator for receiving the input voltage and a synchronization signal to produce a digital error signal, and a second pulse width modulator for receiving the digital error signal at a synchronization port. The pulse width modulators produce respective digital signals which are converted into output analog power signals by transformer and rectifier sections. An error detector compare the voltage of the output power to a predetermined voltage level and produce an analog error feedback signal for transmission to the first pulse width modulator.

20 Claims, 4 Drawing Sheets

ADJUSTABLE DC-TO-DC CONVERTER WITH SYNCHRONOUS RECTIFICATION AND DIGITAL CURRENT SHARING

CROSS REFERENCE TO RELATED APPLICATION

This Application is related to U.S. patent application Ser. No. 09/335,997.

BACKGROUND OF THE INVENTION

1. Field of the Invention

The present invention relates to electrical power conversion and, more particularly, to switching power supply devices.

2. Background Information

In the present state of the art, electrical power conversion development is directed to power converter designs which provide for increased monitoring functions and which can sustain increased operating power densities. As is well known, the power density of an electrical power converter can be improved by reducing the physical sizes of its power processing components: transformers, inductors, power transistors, and capacitors. In a switching power supply topology, for example, component size can be reduced by increasing the converter switching frequency. However, for low-voltage power supplies the primary factor limiting the operating power density is the efficiency of the power converter. Low-voltage, high-power power supplies find widespread application in electronic devices such as laser diode systems and computers operating high processing speeds. Non-isolated converters with synchronous rectification topologies may be used in such applications.

It is thus highly desirable to improve the efficiency of a power converter. Among the benefits realized, in addition to achieving a higher power density, is that the life of the converter is extended because there is less wasted power produced requiring dissipation. Most of the power requiring dissipation originates in the output rectifier, which may account for 50% to 75% of the waste power in the converter. Converters having moderate to high power densities are known in the art, but such converters typically require special application, additional heat sinks, or power derating for reliable operation.

In isolated power converter designs, forward and fly-back topologies use a direct drive scheme for synchronous rectification where the switching transistors are driven directly by the secondary of the power transformer. Although such configurations are relatively simple, they tend to be very inefficient because neither zero voltage nor current switching is attained during operation. Furthermore, forward and fly-back topologies do not efficiently utilize the magnetic core of the transformer (e.g., a forward converter topology will utilize only half of a component transformer core). Moreover, for synchronous rectifier control circuits, such as that exemplified by U.S. Pat. No. 5,956,245, "Circuit and method for controlling a synchronous rectifier converter," issued to Rozman, active clamps may be required.

Other power converter configurations derive a driving signal for control of the output switching transistors from the input side of the converter by capacitance coupling these input signals to the output signals. This approach increases the isolation capacitance and sacrifices a critical parameter of the power converter. In yet another configuration, phase-locked loops are used to synchronize the input and output switching frequencies, such as may be found in a control circuit which includes a synchronous rectification driver such as International Rectifier driver IR1175.

It is known in the prior art to configure a push-pull topology such that the master unit switches at a signal level 10% higher than the slave unit(s). In this topology, an oscillator output signal produced by the master PWM is used to drive the slave units. The oscillator output signal provided by the master PWM does not include a feedback error signal which modulates the ON time of the output feedback error signal which, in turn, modulates the ON time of the output drivers. Accordingly, output current sharing was neither possible nor predictable to any degree of accuracy.

A power supply system including a plurality of parallel connected power supplies is disclosed in U.S. Pat. No. 4,717,833, "Single wire current share paralleling of power supplies," issued to Small. Small '833 teaches that a master/slave scheme is not possible in redundant operation because of potential failure of the master unit. If the output of either master or slave shorts (due to the output capacitor failure), the so called redundant system is useless.

In the present state of the art, redundant systems have two or more identical power sources such that the inputs of the power sources share the same input power bus (i.e., all inputs are fused). The power source outputs are combined by means of OR-ing diodes or power transistors, and only one power source is on at a time. If one power source should fail, another power source takes over.

Therefore, there is a need for a DC-to-DC converter with high efficiency, high power density, output current sharing, and bidirectional control.

SUMMARY OF THE INVENTION

By using synchronous rectification in a power conversion system, the efficiency of the conversion system can be greatly improved to achieve higher power densities and eliminate the need for a heat sink or for derating of the system. Two or more power converters can then be connected in parallel, with corresponding switching frequencies synchronized, to deliver the required power while equally sharing the load. The power conversion system of the present invention includes at least a master power converter and a slave power converter. Each power converter includes a respective pulse width modulator for receiving the input voltage and a corresponding digital feedback signal produced from an analog error feedback signal derived from comparing the output voltage to a predetermined voltage level. The master pulse width modulator provides its digital feedback signal to the slave master pulse width modulator synchronization port. Each power converter further includes a transformer for receiving the input voltage and the respective digital feedback signal, a rectifier connected to the transformer, and an error detector connected to the rectifier.

The disclosed power conversion method can be used in designing power sources using voltage or current mode push-pull PWM, with the additional features. There is secondary side synchronous rectification switching at zero volts (drain to source) and bi-directional output voltage adjustment. It can further be used in any power conversion topology such as forward fly-back, half- or full-bridge, and fixed or variable switching frequency, for example.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
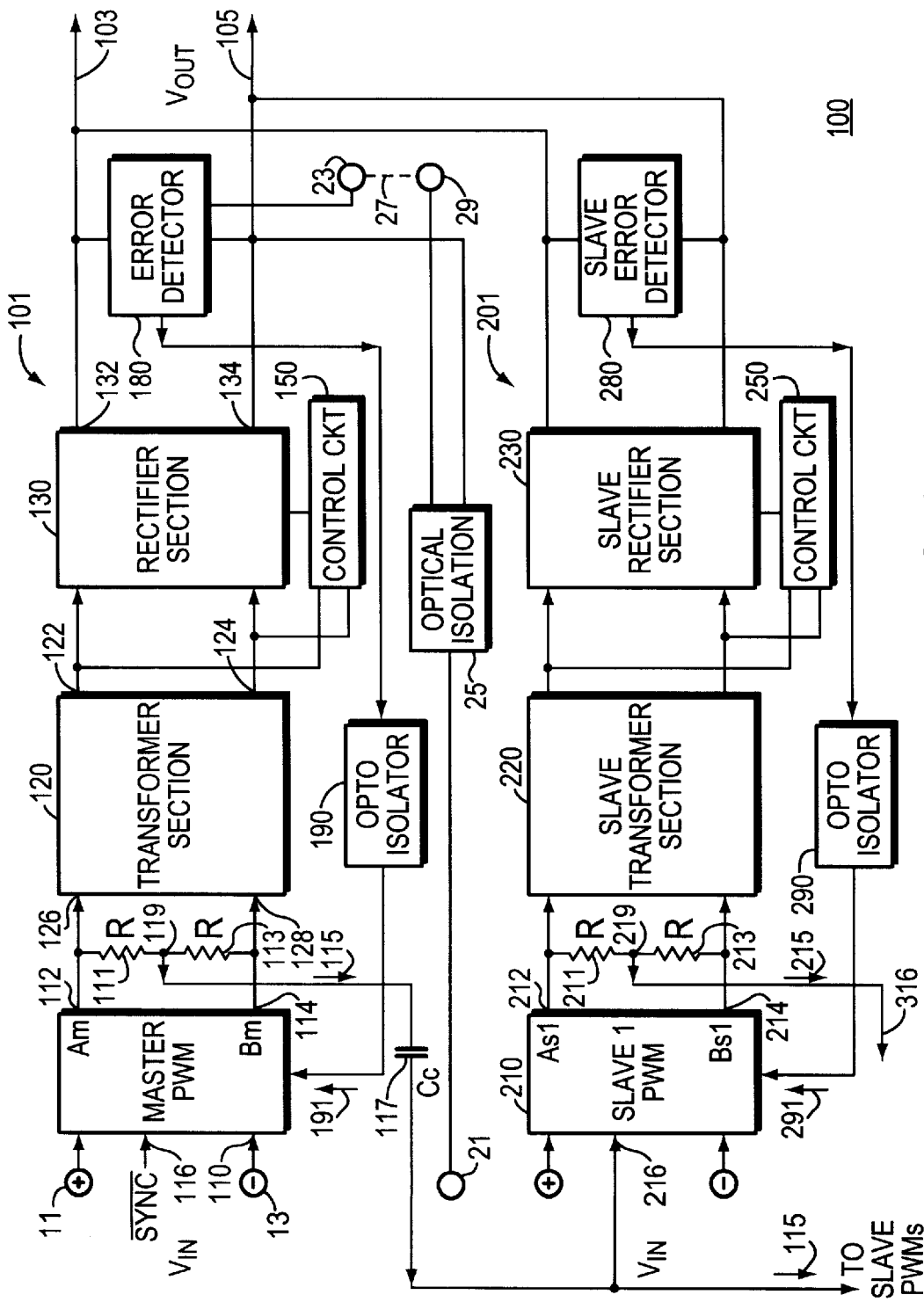
FIG. 1 is a simplified block diagram of a power conversion system including a master power converter, a slave power converter, and an optical isolation circuit in accordance with the present invention.

There is shown in FIG. 1 a power conversion system 100 in accordance with the present invention as can be used for converting electrical power at an input voltage ($V_{IN}$) to an output voltage ($V_{OUT}$). The output voltage $V_{OUT}$ level can be adjusted at an adjustment port 23, as explained in greater detail below. In a typical application, $V_{IN}$ is between nine and eighteen volts and applied across a high input pin 11 and a low input pin 13. The power conversion system 100 includes a master power converter 101 and at least a first slave power converter 201. The master power converter 101 includes a current-mode master pulse width modulator (PWM) 110 for receiving $V_{IN}$ and for inputting a synchronization signal (SYNC) at a SYNC port 116, as explained in greater detail below. As is known in the relevant art, the master PWM 110 produces a digital signal having a duty cycle which is a function of the input voltage signal and the output load. The master PWM 110 includes two PWM output ports 112 and 114 (providing digital signals $A_m$ and $B_m$) connected to a transformer section 120. Resistors 111 and 113 are serially connected across the master PWM output ports 112 and 114, and a digital error signal 115 is taken from a signal point 119 common to the resistors 111 and 113.

The first slave power converter 201 includes a slave PWM 210 for receiving $V_{in}$ as shown and for inputting the digital error signal 115 at a slave SYNC port 216. The digital error signal 115 is also provided to the SYNC ports of any additional slave power converters (not shown) that may be included in the power conversion system 100. The slave PWM 210 (and the master PWM 110) can be, for example, a regulating pulse width modulator SG3526 (voltage mode PWM) manufactured by LinFinity Microelectronics Inc.

The slave PWM 210 includes two PWM output ports 212 and 214 (providing digital signal $A_{s1}$ and $B_{s1}$) connected to a slave transformer section 220. Resistors 211 and 213 are serially connected across the slave PWM output ports 212 and 214. A digital error signal 215 is available at a signal point 219, but is not used unless the slave power converter 201 is needed as a master power converter, for example, upon failure of the master power converter 101. Under these circumstances, the digital error signal 215 would be provided to the slave power converters in the power conversion system 100 as indicated by a lead 316, in place of the digital error signal 115.

The transformer section 120 receives the digital signal from the master PWM 110 and provides an analog signal to a rectifier section 130. The rectifier section 130 provides $V_{OUT}$ to an electrical load (not shown) via conversion system output ports 103 and 105. A synchronous rectification control circuit 150 is connected across transformer output ports 122 and 124 and provides control to the rectifier section 130. An error detector 180 is connected across rectifier output ports 132 and 134 to monitor the voltage level of the output power produced by the rectifier section 130 and provides an analog error feedback signal 191 to the master PWM 110 via an opto-isolator 190. Additionally, an optical isolation circuit 25 may be provided to enable the adjustment of the output voltage $V_{OUT}$ from either input or output side of the power conversion system 100. When the optical isolation circuit 25 is to be included in the power conversion system 100, electrical connection is provided as indicated by dotted line 27.

The slave transformer section 220 receives the digital signal $A_{s1}$ and $B_{s1}$ from the slave PWM 210 and provides an analog signal to a slave rectifier section 230. The slave rectifier section 230 provides $V_{OUT}$ via the conversion system output ports 103 and 105. A slave control circuit 250 is connected across the slave transformer 220 and provides control to the slave rectifier section 230. A slave error detector 280 provides an analog error feedback signal 291 to the slave PWM 210 via an opto-isolator 290. It should be understood that the slave error detector 280 and the opto-isolator 290 are not required for normal operation of the power conversion system 100 but are included in the event that the error detector 180 in the master power converter 101 fails. Under such circumstances, the first slave power converter 201 can be used as a replacement master unit with the slave error detector 280.

Figure 2:
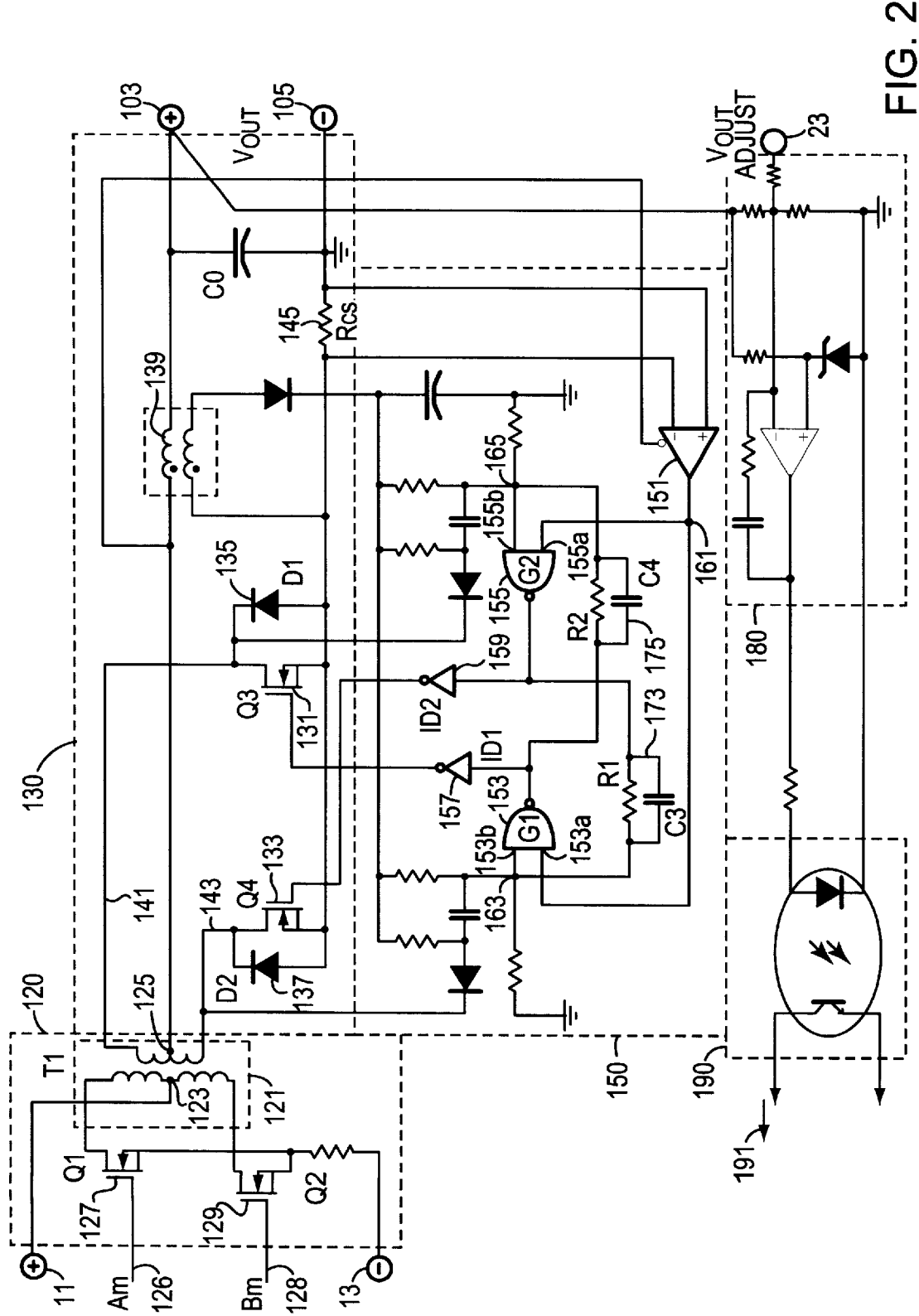
FIG. 2 is a schematic diagram of the master power converter of FIG. 1 showing a transformer section, a rectifier section, a control section, and an error detector.

The digital signal from the master PWM output ports 112 and 114 is provided to input ports 126 and 128 on the primary side of a transformer 121 in the transformer section 120 as shown in FIG. 2. The voltage signal ($A_m$) from the master PWM output port 112 is provided to the gate of a first transistor 127 ($Q_1$) and the voltage signal ($B_m$) from the PWM output port 114 is provided to the gate of a second transistor 129 ($Q_2$). The input voltage $V_{IN}$ is applied from the high input pin 11 to a center tap 123 of the transformer 121, and from the low input pin 13 to the ends of the primary winding via the first transistor 127 and the second transistor 129 respectively. In a preferred embodiment the first and second transistors 127 and 129 are power MOSFET devices.

In the rectifier section 130, here configured as a full-wave rectifier, a first output lead 141 of the secondary winding of the transformer 121 is connected to a third transistor 131 ($Q_3$) which is in parallel with a first diode 135 ($D_1$). A second output lead 143 is connected to a fourth transistor 133 ($Q_4$) which is in parallel with a second diode 137 ($D_2$). In a preferred embodiment, the transistors 127, 129, 131, and 133 are n-channel MOSFET devices. A center tap 125 of the secondary winding of the transformer 121 provides the voltage output signal appearing at the conversion system output port 103 via an inductor 139. The anodes of the diodes 135 and 137 are connected to the conversion system output port 105 as shown.

Inductive components of the power converter system 100, such as the inductor 139 and the transformer 121, may comprise planar devices utilizing a portion of the system circuit board. In a preferred embodiment, the power converter system 100 includes a circuit board having twenty-eight conductive layers for construction of the transformer 121 and the inductor 139. Planar inductive devices provide components of improved efficiency having a high degree of manufacturing repeatability.

The control circuit 150 is a negative-edge triggering flip-flop circuit with two triggering inputs and two outputs, where the "ON" time for each output is less than the "OFF" time for the respective signal. A differential comparator 151 in the control circuit 150 senses the output current passing through the converter output port 105 via a sensing resistor 145 ($R_{CS}$). The output of the differential comparator 151 is latched at either negative-going secondary winding output lead 141 or 143. The control circuit 150 is thereby enabled when the voltage present at the secondary winding of the transformer 121 is zero.

The output of the differential comparator 151 is provided as first input signals to an input 153a of a first NAND gate 153 ($G_1$) and to an input 155a of a second NAND gate 155 ($G_2$). The output of the first NAND gate 153 is provided to the gate of the third transistor 131 via a first inverting driver 157 ($ID_1$), and is also provided as a second input signal to the second NAND gate 155. The output of the second NAND gate 155 is provided to the gate of the fourth transistor 133 via a second inverting driver 159 ($ID_2$), and is also provided as a second input signal to the first NAND gate 153.

To describe the operation of the rectifier section 130 in conjunction with the control circuit 150, it is helpful to begin at the following initial state conditions: i) the second output lead 143 is HIGH, ii) the third transistor 131 is ON, iii) the fourth transistor 133 is OFF, and iv) an output node 161 of the differential comparator 151 is HIGH. When the second output lead 143 switches LOW, a negative-going pulse is applied to an input 153b of the first NAND gate 153 at a biased input node 163. The input 153a of the first NAND gate 153 is HIGH because of the HIGH state of the comparator output node 161.

The output signal of the first NAND gate 153 turns the third transistor 131 OFF via the first inverting driver 157. The output signal of the first NAND gate 153 is also provided to an input 155b of the second NAND gate 155 via a biased input node 165 after incurring a propagation delay ($\tau_{175}$) by passing through an RC circuit 175 ($R_2$, $C_4$). The second NAND gate 155 inverts the signal present at node 165, and the inverted signal is subsequently transmitted to the biased input node 163 after incurring a propagation delay ($\tau_{173}$) by passing through an RC circuit 173 ($R_1$, $C_3$). The biased input node 163 is thus forced LOW, and the fourth transistor 133 is turned ON. The signal turning the fourth transistor 133 ON occurs after the third transistor 131 has turned OFF. The time delay ($\tau$) is at least as great as the cumulative sum of the propagation delays incurred by the output signal of the first NAND gate 153 in passing through the RC circuit 175 and the second NAND gate 155 ($\tau_{155}$), and that incurred by the output signal of the second NAND gate 155 in passing through the RC circuit 173 and the first NAND gate 153 ($\tau_{153}$). That is, $$\tau \approx \tau_{175} + \tau_{155} + \tau_{173} + \tau_{153} \quad \quad 1)$$

This time delay $\tau$ ensures that the fourth transistor 133 will not be turned ON until after the third transistor 131 has been turned OFF.

In a preferred embodiment, the duration of the negative-going pulse provided on the second output lead 143 exceeds the time delay $\tau$. Accordingly, when the first output lead 141 switches LOW, the third transistor 131 is OFF and the fourth transistor 133 is ON. Subsequently, a negative pulse is applied to the second NAND gate 155 via the biased input node 165. The input 155a of the second NAND gate 155 is HIGH because of the HIGH state of the comparator output node 161.

The output signal of the second NAND gate 155 turns the fourth transistor 133 OFF via the second inverting driver 159. The output signal of the second NAND gate 155 also provided to the input 153b of the first NAND gate 153 via the biased input node 163 after incurring the propagation delay of $\tau_{173}$. The first NAND gate 153 inverts the signal, and the inverted signal is transmitted to the biased input node 165 after incurring the propagation delay of $\tau_{175}$. The biased input node 165 is thus forced LOW, and the third transistor 131 is turned ON. Thus, the time delay $\tau$ also ensures that the third transistor 131 will not be turned ON until after the fourth transistor 133 has been turned OFF.

It can be appreciated by one skilled in the relevant art that the switching actions of the third transistor 131 and the fourth transistor 133 occur during the 'dead time' of the transformer 121, that is, when the secondary voltage is zero. The master PWM 110 provides a minimum reset time for the transformer 121 so as to produce this dead time.

During operation of the power conversion system 100, the first slave power converter 201 (as well as any other slave power converters receiving the digital error signal 115) operates with the same pulse width as the master power converter 101. That is, the slave power converters will be 'turning on and off' at the same time as the master power converter 101. This configuration results from the use of the single (i.e., master) error feedback signal 191, generated from the error detector 180 and fed back to the master PWM 110.

In a preferred embodiment, the digital signal $A_m$ and $B_m$ has an amplitude of approximately ten volts. This signal strength is of sufficient magnitude to drive the first and second transistors 127 and 129 in the transformer section 120. However, this voltage level is too large for use as a logic-level error signal. Additionally, the frequency of the digital signal is only one half the frequency of the synchronization signal appearing at the SYNC port 116. The voltage level of the digital signal $A_m$ and $B_m$ is therefore adjusted to provide the digital error signal 115 by utilizing the voltage divider network of resistors 111 and 113. In a preferred embodiment, the values of the resistors 111 and 113 are equal and the digital error signal 115 has one half the voltage level of the digital signal. Moreover, as the frequency of the signal appearing at the signal point 119 is the same as the frequency of the signal appearing at the SYNC port 116, the resistor network of resistors 111 and 113 also serves to double the frequency of the digital feedback signal. Accordingly, the digital error signal 115 appearing at the signal point 119 has the appropriate frequency and voltage level for use as an error signal for transmission to the first slave power converter 201.

Figure 3:
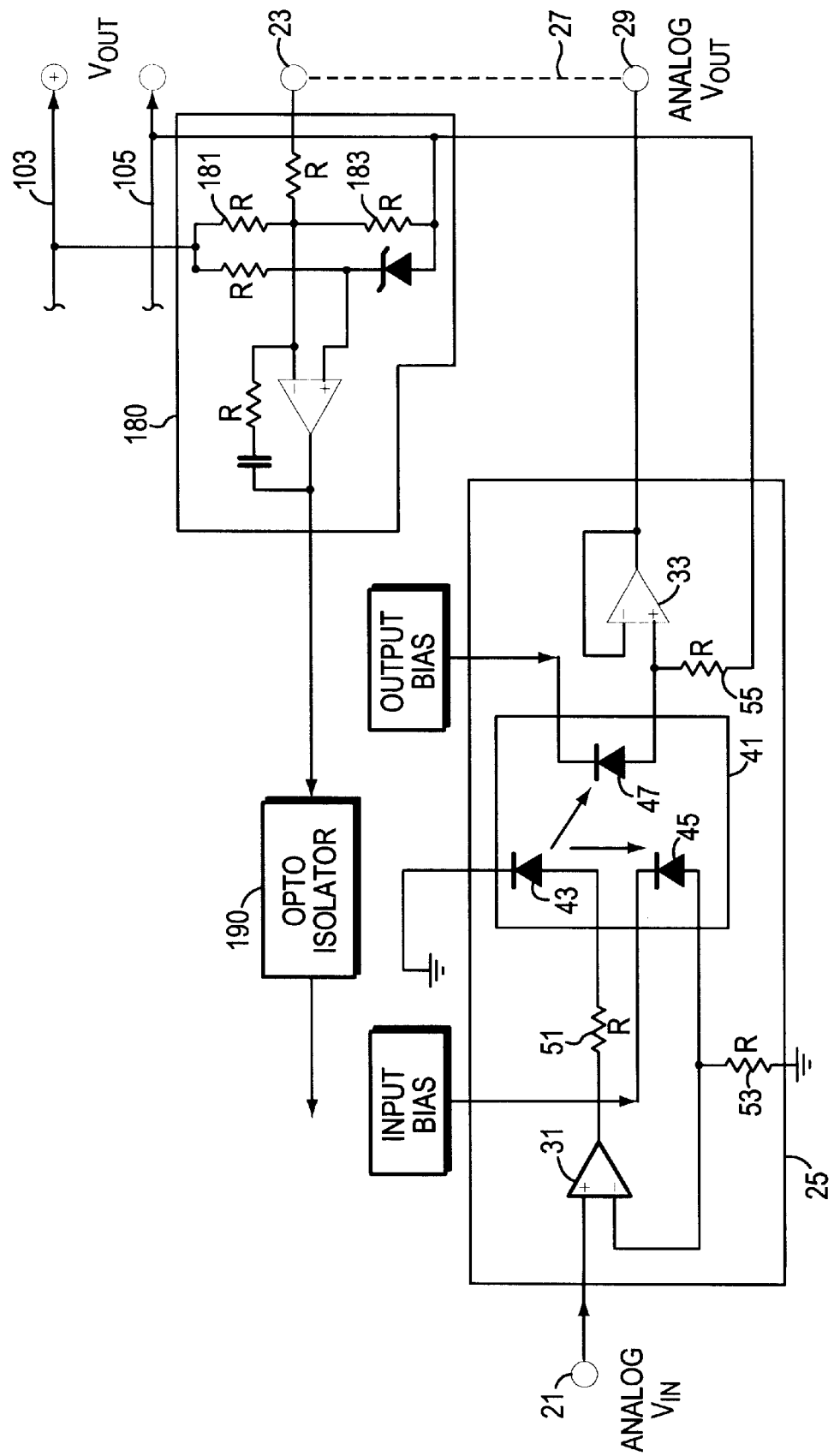
FIG. 3 is a schematic diagram of the optical isolation circuit and the master error detector of FIG. 1.

FIG. 3 provides detail of the optical isolation circuit 25 of FIG. 1. The optical isolation circuit 25 includes an optocoupler 41, which provides an isolation barrier, and operational amplifiers 31 and 33. The optocoupler 41 may comprise, for example, a linear optocoupler IL 300 manufactured by Siemens Corporation. In the optocoupler 41, a light-emitting PN diode 43 drives matched PIN diodes 45 and 47. The current through the PN diode 43 is determined by the output voltage of the operational amplifier 31 and a resistor 51.

The operational amplifier 33 is connected in a voltage-follower configuration and provides a voltage reference in the optical isolation circuit 25. It can be shown that the output voltage ($V_{OUT}$) is a function of the analog voltage at input pin 21 ($AV$)$_{IN}$ in accordance with the expression:

$$V_{OUT} = \frac{R_{55}}{R_{53}} (AV)_{IN} \left[ 1 + \frac{R_{181}}{R_{183}} \right] \quad \quad 2)$$

where the resistance values in equation (2) are those of resistor 53 ($R_{53}$), resistor 55 ($R_{55}$), resistor 181 ($R_{181}$), and resistor 183 ($R_{183}$). Voltage adjustment can be performed at an input adjustment port 21 or an output adjustment port 29.

The output adjustment port 29 is connected to the adjustment port 23 of the error detector 180 as indicated by the dotted line 27. It can be appreciated by one skilled in the relevant art that the optical isolation circuit 25 functions as an analog isolated amplifier having a gain as given by equation (2).

Figure 4:
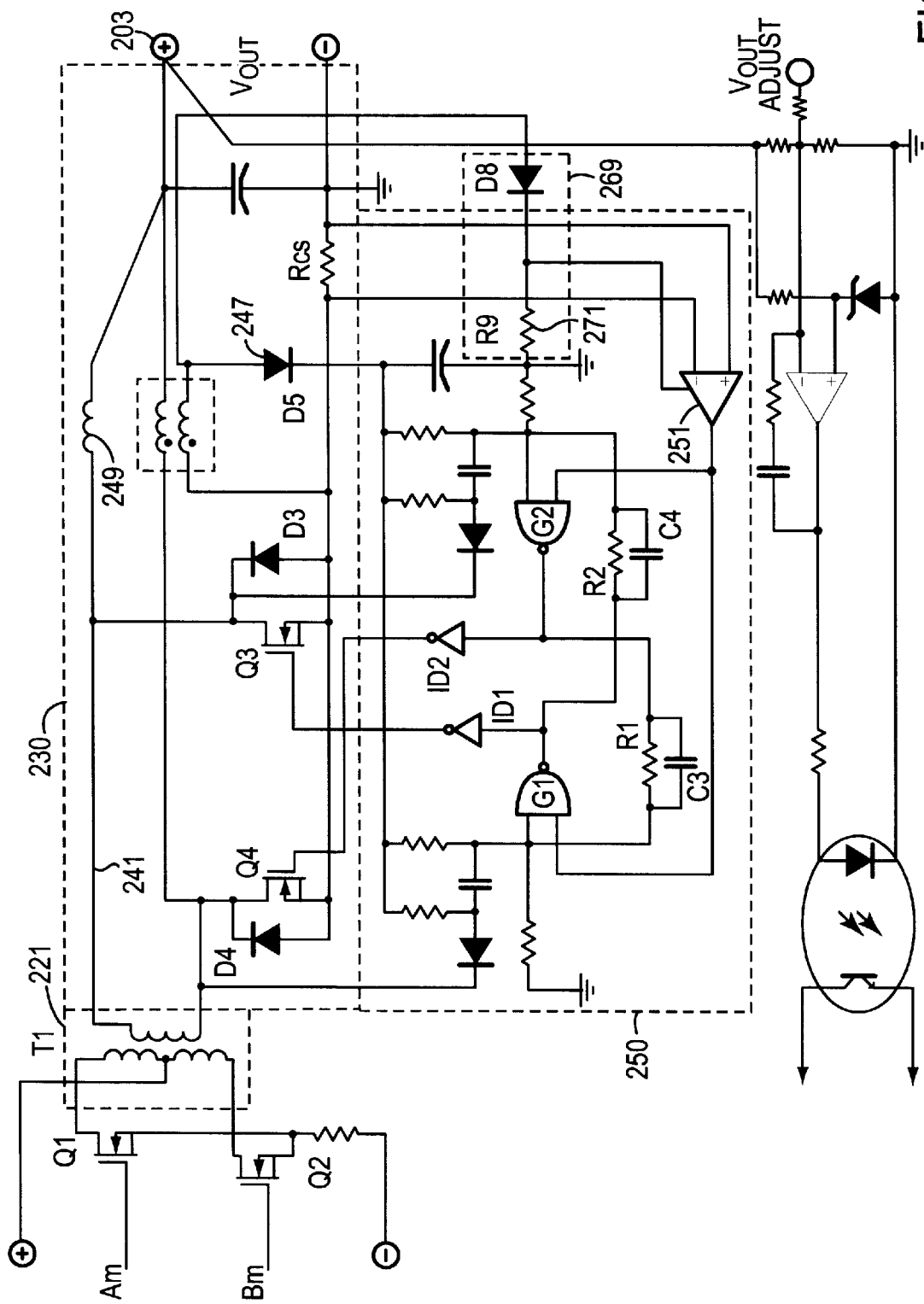
FIG. 4 is an alternative embodiment of the master power converter of FIG. 2 including a positive-edge triggering control section.

In an alternative embodiment, shown in FIG. 4, a control circuit 250 positive-edge triggering flip-flop circuit includes a differential comparator 251 which has a positive edge trigger. A bipolar signal is generated at the anode of a diode 269 ($D_8$) in a rectifier section 230. The bipolar signal passes through the diode 269 and a resistance 271 ($R_9$) and becomes unipolar to drive the output latch of the differential comparator 251. The rectifier section 230 also includes an inductor 249 provided between one output 241 of the secondary winding of a transformer 221 and a converter output port 203. As can be appreciated by one skilled in the relevant art, a flyback or forward secondary side DC-to-DC converter configuration results if the inductor 249 is removed.

What is claimed is:

1. A power conversion system suitable for receiving a synchronization signal and converting electrical power from an input voltage to an output voltage, said power conversion system comprising:
   a first pulse width modulator for receiving the input voltage, the synchronization signal, and an analog error feedback signal, and producing a first digital signal therefrom;
   first transformer means for receiving the input voltage, said first transformer means further connected to said first pulse width modulator for receiving said first digital signal and producing a first analog signal therefrom;
   first rectifier means connected to said first transformer means, said first rectifier means for producing a first power output from said first analog signal;
   error detection means connected to said first rectifier means for monitoring the voltage of said first power output and producing therefrom said analog error feedback signal;
   means for producing a digital error signal from said first digital signal;
   a second pulse width modulator for receiving the input voltage and said digital error signal, and producing a second digital signal therefrom;
   second transformer means connected to said second pulse width modulator, said second transformer means for receiving said second digital signal and producing therefrom a second analog signal; and
   second rectifier means connected to said second transformer means, said second rectifier means for producing a second power output from said second analog signal.

2. The power conversion system of claim 1 wherein said means for producing said digital error signal comprises a voltage divider network.

3. The power conversion system of claim 1 wherein said error detection means comprises means for comparing the voltage of said first power output with a predetermined voltage.

4. The power conversion system of claim 1 further comprising an opto-isolator disposed between said error detection means and said first pulse width modulator.

5. The power conversion system of claim 1 wherein said first rectifier means includes first and second diode means, said first diode means connected to a first output of said first analog signal and said second diode means connected to a second output of said first analog signal.

6. The power conversion system of claim 5 further comprising a first switching means connected in parallel with said first diode means, and a second switching means connected in parallel with said second diode means.

7. The power conversion system of claim 6 further comprising a control circuit connected to said first transformer means, said control circuit including a first NAND gate having an output connected to said second switching means and a second NAND gate having an output connected to said first switching means.

8. The power conversion system of claim 7 wherein said first NAND gate output is connected to an input of said second NAND gate via a first delay circuit, and said second NAND gate output is connected to an input of said first NAND gate via a second delay circuit.

9. The power conversion system of claim 8 wherein said control circuit further includes a differential comparator for sensing the current level of said first power output.

10. The power conversion system of claim 9 wherein said differential comparator provides an output signal to a second input of said first NAND gate and to a second input of said second NAND gate.

11. The power conversion system of claim 10 further comprising a voltage adjustment port connected to said error detection means.

12. The power conversion system of claim 11 further comprising an optical isolation circuit disposed between said voltage adjustment port and said error detection means.

13. The power conversion system of claim 1 wherein said first rectifier means includes inductive means connected to a third output of said first transformer means.

14. The power conversion system of claim 13 wherein said inductive means comprises a planar inductive element.

15. A power conversion system suitable for receiving a synchronization signal and converting electrical power from an input voltage to an output voltage, said power conversion system comprising:
   a master power converter having a master input port and a master output port, said master power converter for converting the electrical power provided at said master input port to the output voltage at said master output port, said master power converter including
   a master pulse width modulator for receiving the input voltage and the synchronization signal and therefrom producing a master digital signal;
   a voltage divider for adjusting the master digital signal so as to produce a digital error signal; and
   a slave power converter having a slave input port connected to the electrical power and a slave output port connected to said master output port, said slave power converter for converting the electrical power to the output voltage, said slave power converter including
   a slave pulse width modulator for receiving the input voltage and said digital error signal and therefrom producing a slave digital signal.

16. The power conversion system of claim 15 further comprising:
   means for converting said master digital signal into a master power output having an amplitude substantially the same as the output voltage; and
   means for converting said slave digital signal into a slave power output having an amplitude substantially the same as the output voltage.

17. The power conversion system of claim 16 wherein said means for converting said master digital signal comprises:

a transformer having an input and an output, said transformer input for receiving said master digital signal;

rectifier means including first and second current switching means, said rectifier means connected to said transformer output; and control means connected to said transformer output, said control means including a first NAND gate having an output connected to said second switching means and a second NAND gate connected to said first switching means.

18. A method for converting electrical power at an input voltage to an output voltage by means of synchronous rectification, said method comprising the steps of:

providing a synchronization signal to the synchronization port of a first pulse width modulator;

providing the input voltage to said first pulse width modulator so as to produce a first digital signal;

deriving a digital error signal from said first digital signal;

providing said digital error signal to the synchronization port of a second pulse width modulator;

providing the input voltage to said second pulse width modulator so as to produce a second digital signal;

providing the input voltage and said first digital signal to a first transformer so as to produce a first analog signal;

providing the input voltage said second digital signal to a second transformers so as to produce a second analog signal;

rectifying the first analog signal to produce a first power output; and rectifying the second analog signal to produce a second power output synchronous with said first power output.

19. The method of claim 18 further comprising the steps of:

comparing said first power output to a predetermined voltage level so as to produce an analog error feedback signal; and providing said analog error feedback signal to said first pulse width modulator.

20. The method of claim 18 further comprising the steps of:

sensing the current level of said first power output by means of a differential comparator;

providing an output signal from said differential comparator to an input of a first NAND gate and to an input of a second NAND gate;

providing the output from said second NAND gate to an input of said first NAND gate, and providing the output from said first NAND gate to an input of said second NAND gate;

providing the output from said second NAND gate to a first current switch, said first current switch connected to a first output of said first transformer; and providing the output from said first NAND gate to a second current switch, said second current switch connected to a second output of said first transformer.

* * * * *